Patented Oct. 10, 1944

2,359,813

UNITED STATES PATENT OFFICE 2,359,813

PROTECTIVE COVERING FOR WELDING RODS

Rene Wassermann, New York, N. Y.

No Drawing. Application April 6, 1942, Serial No. 437,856

3 Claims. (Cl. 219—8)

This invention relates to welding rods or electrodes and more particularly to rods or electrodes for use in connection with welding or similar bonding processes on bases made of ferrous or non-ferrous material, on aluminum articles or on any work pieces containing zinc, magnesium or the like.

It is an object of the present invention to provide means whereby to attribute a better appearance to electrodes of the above nature, while the properties of the alloy of which the core of said electrode consists, are not substantially changed for the welding or like operation.

It is another object of the present invention to provide covering means for electrodes whereby the same become more fluid, and the melting point of the alloy of which said core of said electrodes consists may be lowered to a desired degree.

A further object of the present invention is to provide means for protecting the surface of welding electrodes or rods to make said surface resistant to corrosion, atmospheric influences and for improving said rods by preventing dezincification thereof during the welding operation.

Yet, another object of the present invention is to provide protective means, such as a layer or coating extending partly or wholly over the surface of welding rods, the thickness of said layer varying in accordance with the purpose and action to be obtained during welding or like bonding operation.

Still a further object of the present invention is to provide means for covering electrodes or welding rods which may be used for soldering, welding, brazing or similar purposes, an ingredient of the alloy of the electrode forming the material for said cover means which is resistant to corrosion and other undesirable atmospheric influences.

Other objects of the invention will appear as the description proceeds, it being understood, however, that it is not intended that the invention be limited to the exact details described herein; and it is further intended that there be included, as part of the invention all such obvious changes and modifications thereof as would occur to a person skilled in the art to which this invention pertains and as would fall within the scope of the claims.

In order to carry the invention into effect, the welding or brazing rod may be dipped into a hot bath containing silver alloy or pure silver or similar corrosion preventive means, whereby an outer film-like coating is obtained on said rod. The thickness of the coating may vary according to the purpose intended and to the action aimed at during the welding or like operation.

Instead of dipping the rod into a bath the coating may be produced by known electro-galvanic methods, by any chemical treatment or reaction, or mechanically, such as by a spraying process.

In place of silver, other types of coating or combined coatings may be used which may comprise silver, the latter being particularly adapted to improve fluidity and appearance of the welding rod.

According to one embodiment of the invention, the welding rod material which may comprise copper, nickel, silicon and zinc, may further be provided with a silver coating of suitable quantity forming a complementary ingredient of the welding material.

Such welding rod material or alloy has been disclosed in my U. S. Patent No. 2,279,284, dated April 7, 1942. The alloy may consist of the herein mentioned ingredients in approximately the following proportions: 2% silver, copper 43% by weight, nickel 11% by weight, silicon .3% by weight and zinc 43.7% by weight.

In accordance with the present invention, it is proposed to incorporate in the aforesaid alloy silver only in such amount that the latter and the silver coating on the rod surface constitute approximately 2% by weight of said alloy.

It is, of course, understood, that the invention is also applicable to rods for gas or torch welding, the body of the rod material (core) being virgin metal, such as copper or zinc or cast-iron on which a silver coating may be sprayed in form of a fine film; it being further proposed that the silver or like coating material preventing corrosion, such as nickel, etc., may extend intermittently or continuously or wholly or only partially over the circumference and length of the welding or brazing rod as the case may be.

It is further contemplated according to the present invention to select any one of the ingredients of brazing or welding alloys solely for use as a coating for the alloyed material forming the core of the electrode or rod, provided that such coating suitably protects the rod against corrosion and other undesired influences (dezincification, formation of oxides) during the welding or similar operation.

The following further examples are given for the purpose of arriving at the invention:

1. Cast-iron welding rod containing approximately

| | Per cent by weight |
|---|---|
| Carbon | 3 |
| Manganese | .5 |
| Phosphorus | .5 |
| Silicon | 3 |
| Sulphur | .1 | receives a silver coating or coating of cadmium by spraying the coating on said rod by means of a spray gun. The thickness of the coating may be .005 inch to .010 inch.

A welding rod consisting of

|  | Per cent by weight |
|---|---|
| Copper | 60 |
| Zinc | 39.7 |
| Manganese | .3 | is coated with silver obtained by dipping the rod in a silver nitrate electro-plating solution of sufficient strength (concentration) for about two (2) minutes which will result in a thin and even film-like coating of required quantity.

It can thus be seen that there has been provided, in accordance with this invention, a rod for welding, brazing, soldering and like operations on metallic bases, which rod comprises a core of weld material, and a corrosion-resistant metallic film extending at least partially over the circumference and length of said core, the thickness of said metallic film being below .01" so as to protect the core surface against the attack of atmospheric influences during storage and without substantially changing the properties of said core, the quantity of said metallic film on said core surface being only of such moderate amount as to leave said base unaffected when said weld metal is applied thereto.

In accordance with the above it is well understood that wide deviations and changes may be made from the embodiments and examples herein set forth without departing from the spirit of this invention.

Having thus described the invention what is claimed as new and desired to be secured by Letters Patent, is:

1. A rod for welding, brazing, soldering, and like operations on metallic bases, comprising a core of weld material, and a corrosion-resistant metallic film extending at least partially over the circumference and length of said core, the thickness of said metallic film being below .01" so as to protect the core surface against the attack of atmospheric influences during storage and without substantially changing the properties of said core, the quantity of said metallic film on said core surface being only of such moderate amount as to leave said base unaffected when said weld metal is applied thereto.

2. A rod for welding, brazing and like operation comprising a core of weld material, said weld material including as a constituent silver, and a film-like coating of silver up to approximately .01 inch thick provided on the surface of said core, said coating of silver serving to lower the melting point of said core material and effectively protecting said core against atmospheric influences during storage.

3. A rod for welding, brazing, soldering and like operation comprising a core of weld material having as main constituents copper, nickel and zinc, and an addition of silver, and a film-like coating of silver of a thickness below .01 inch provided on the surface of said core, the sum of the amounts of silver present in said core and in said coating being substantially equal to the total amount of silver capable of increasing the fluidity of said weld material during welding or like operation, said silver coating protecting said core against atmospheric influences.

RENE WASSERMANN.